(No Model.)
L. S. HAYDEN.
EXPANSIVE BIT.
No. 500,498. Patented June 27, 1893.
Fig. 1
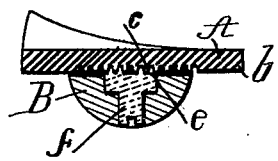
Fig. 5
Fig. 2    Fig. 3    Fig. 4
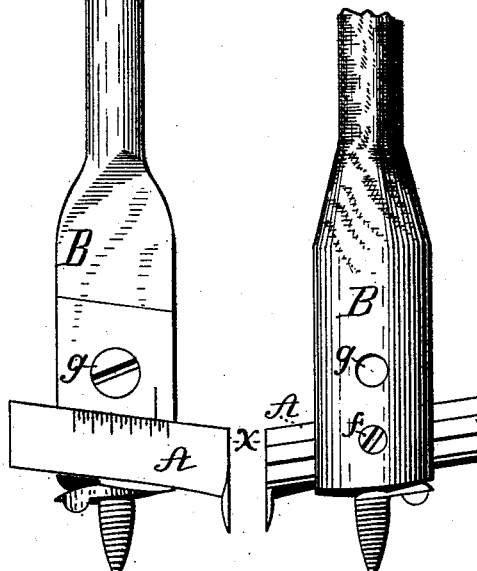 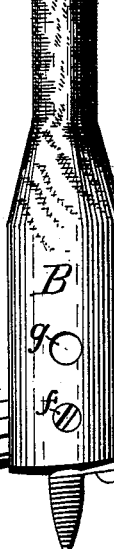 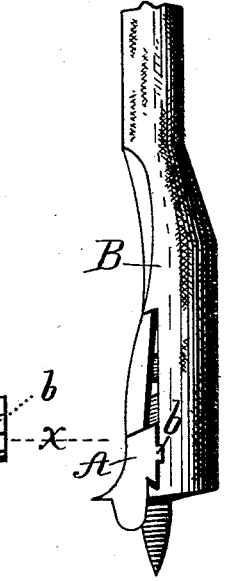 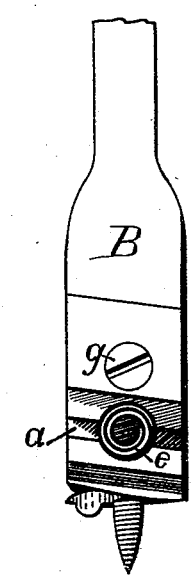
WITNESSES:
George L. Barnes
J. Edward Rowland
INVENTOR
Lewis S. Hayden
BY H. G. Newton
ATTORNEY.

UNITED STATES PATENT OFFICE.

LOUIS S. HAYDEN, OF ESSEX, CONNECTICUT, ASSIGNOR TO ALFRED M. WRIGHT, OF SAME PLACE.

EXPANSIVE BIT.

SPECIFICATION forming part of Letters Patent No. 500,498, dated June 27, 1893.

Application filed November 22, 1892. Serial No. 452,797. (No model.)

*To all whom it may concern:*

Be it known that I, LOUIS S. HAYDEN, a citizen of the United States, and a resident of Essex, in the county of Middlesex and State of Connecticut, have invented certain new and useful Improvements in Expansive Bits, of which the following is a specification.

This invention relates to an improvement in expansive bits for boring wood, and consists in a means for accurately and readily adjusting the expansive cutter so as to cut a hole of the precise diameter required.

In the accompanying drawings Figure 1 is a front view and Fig. 2 is a rear view of the stock "B" of the expansive bit with the expansive cutter "A." Fig. 3 is a side view of the bit and cutter. Fig. 4 is a front view of the stock without the cutter, showing the scroll "e" by the turning of which the cutter is adjusted. Fig. 5 is a section of the expansive cutter on line "x—x," Fig. 2, showing the teeth "c" in the ridge "b" in the back by means of which, in combination with the scroll "e," its position is adjusted.

As commonly used, the expansive cutter is secured in the stock by the clamping screw "g" and when it is desired to adjust its position the clamping screw is loosened, and the adjustment made by hand. It is very difficult in this manner to make a delicate change in the adjustment.

In my invention, a ridge "b" is made on the back of the cutter and provided with projecting teeth. This ridge is constructed so as to fit into a groove "a" in the stock and bring the teeth "c" into juxtaposition with the scroll "e." A pin "f" with a scroll "e" upon the large end is inserted in a hole through the stock. A slot for a screw driver is made in the head of the pin "f" in which to insert the screw driver at the back part of the stock so that it may be turned. When it is desired to adjust the cutter the clamping screw "g" is slightly loosened, and by turning the pin "f" the threads of the scroll act in conjunction with the projecting teeth on the back of the cutter, and thus the cutter may be adjusted to the exact position required. When the expansive cutter is so adjusted it is fastened in its place by the clamping screw "g" in the usual manner.

I am aware that bits have been made so that the cutter may be moved and adjusted by a tangent screw in the side of the stock. By using my method, however, the stock need not be so thick, is stronger, and the bit is easier and cheaper to make, and there is more room for the shavings to escape, and the cut is held more firmly in place.

I claim—

In an expansive bit, the combination of an expansive cutter having projecting teeth on the back, with a pin passing through the center of the stock perpendicularly, or nearly perpendicularly, to its face, and having a scroll upon the inner end, and co-operating with the projecting teeth on the back of the cutter, so as to adjust the cutter to the exact position required, substantially as described.

Signed at Essex, in the county of Middlesex and State of Connecticut, this 4th day of November, A. D. 1892.

LOUIS S. HAYDEN.

Witnesses:
G. L. TUCKER,
NORTHAM WRIGHT.